US012670097B2

(12) United States Patent
Frank et al.

(10) Patent No.: US 12,670,097 B2
(45) Date of Patent: *Jun. 30, 2026

(54) SYSTEM AND METHOD FOR MANAGING EVENT MESSAGES IN A CACHE COHERENT INTERCONNECT

(71) Applicant: ARTERIS, INC., Campbell, CA (US)

(72) Inventors: Michael Frank, Sunnyvale, CA (US); Mohammed Khaleeluddin, Union City, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/974,774

(22) Filed: Dec. 9, 2024

(65) Prior Publication Data

US 2025/0103497 A1 Mar. 27, 2025

Related U.S. Application Data

(63) Continuation of application No. 18/051,869, filed on Nov. 1, 2022, now Pat. No. 12,164,428.

(60) Provisional application No. 63/274,530, filed on Nov. 2, 2021.

(51) Int. Cl.
*G06F 12/0817* (2016.01)

(52) U.S. Cl.
CPC .... *G06F 12/0828* (2013.01); *G06F 2212/621* (2013.01)

(58) Field of Classification Search
None
See application file for complete search history.

(56) References Cited

U.S. PATENT DOCUMENTS

| | | | | | |
|---|---|---|---|---|---|
| 2012/0147567 | A1* | 6/2012 | Lee | .......................... | H05K 1/181 |
| | | | | | 361/729 |
| 2022/0182937 | A1* | 6/2022 | Guo | ..................... | H04L 61/2553 |

* cited by examiner

*Primary Examiner* — Baboucarr Faal
(74) *Attorney, Agent, or Firm* — Dana Legal Services; Jubin Dana

(57) ABSTRACT

A cache coherent interconnect connected to one or more agents, such as CPUs, GPUS, Peripherals, etc. using network interface units (NIUs), and having one or more internal modules, such as a directory, is provided with one or more event-to-message converters, and one or more message-to-event converters. When a particular event occurs within one of the agents or modules, a message is initiated and transmitted using the existing interconnect wiring to one or more agents or modules, which have associated NIUs, that need to be aware of the event. Response messages showing the status of the event-message may also be generated. Therefore, messages are sent when events occur, instead of constantly using bandwidth for status updates when no status is changing, making the interconnect more efficient and freeing up bandwidth. These converters are provided as additional hardware blocks incorporated into the various NIUs and modules.

9 Claims, 7 Drawing Sheets

700

State
Timing

800

SYSTEM AND METHOD FOR MANAGING EVENT MESSAGES IN A CACHE COHERENT INTERCONNECT

CROSS REFERENCE TO RELATED APPLICATION

This application is a continuation of U.S. Non-Provisional application Ser. No. 18/051,869 filed on Nov. 1, 2022, which claims the benefit of U.S. Provisional Patent Application Ser. No. 63/274,530 filed on Nov. 2, 2021 entitled SYSTEM AND METHOD FOR EVENT MESSAGES IN A CACHE COHERENT INTERCONNECT by Michael FRANK et al., the entire disclosure of which is incorporated herein by reference.

FIELD OF TECHNOLOGY

The present technology is in the field of computer design tools and more precisely, related to cache coherent interconnects.

BACKGROUND

In a cache coherent interconnect, such as those with a distributed implementation, a set of connected agents (CPUs, GPUs, etc.) have internal memory caches. These caches are kept coherent; when a memory location is updated by an agent, all the other agents can see the updated value, even if the memory location that was updated was already cached in another agent. These memory connections are maintained with a set of Network Interface Units (NIUs) that are in turn connected to each other through a network-on-chip (NoC) transport interconnect that allows these to be synchronized. Additionally, the interconnect connects, via individual wires, senders to receivers, so that events can be sent from senders to receivers.

Currently, events are driven along individual wires, which are connected from every sender to every receiver in a point-to-point fashion. The generation and sending of events are a problem when, for instance, the number of individual events to transport, the number of senders and the number of receivers grow large. Other challenges, such as different clock or power domain for the sender and the receiver, increase the complexity of the implementation.

In complex systems, asynchronous elements, elements without a memory cache, or elements in which a proxy cache exists within the NIU itself may also be connected. Different connected elements may be functioning using clocks of different speeds, and lead to problems maintaining synchronization across the clock boundaries throughout the system using connections in the interconnect. This can tie up network bandwidth, reducing efficiency, and requires computing cycles to monitor and process, consuming additional power just to maintain the system. Such synchronization has been typically done, for example for ARM microprocessors, by using standard ARM synchronization protocols, but with larger numbers of asynchronous agents, the number of wires and signals that must be maintained using these conventional protocols becomes unwieldy. Therefore, there is a need for a system that allows the existing connections between network interface units (NIUs) and the interconnect to be more efficiently used to maintain memory coherence.

SUMMARY

In accordance with the invention, an interconnect is connected to one or more agents, such as CPUs, GPUs, Memory managers, Peripherals, etc. through network interface units (NIUs). The interconnect includes one or more internal modules, such as a directory. The interconnects NIUs includes one or more event-to-message converters and one or more message-to-event converters. These converters and receivers are provided as additional hardware IP blocks, incorporated into the various NIUs, and are part of the interconnect.

In accordance with some aspects and embodiments of the invention, both the event-to-message converters and the message-to-event converters function as state machines. When a state changes, either transmitted by one of the agents connected to one of the NIUs, or within one of the units connected to the network, the state change initiates a message to be sent out using the transport interconnect. Upon receipt, the messages are transformed back into a suitable state in a register or transformed into a port logic level transition. In some embodiments of the invention, the receiver can send a response acknowledging receipt of the message containing the event information, and the response can indicate correct receipt and processing of the event, or can indicate an error condition.

In some embodiments, each NIU and/or module in the interconnect is provided with at least one of an event-to-message converter, or at least one message-to-event converter. In some embodiments, some NIUs and/or modules in the interconnect are provided with both an event-to-message converter and a message-to-event converter. NIUs/modules which do not observe events may not need to be provided with event-to-message converters, while NIUs/modules that do not need to be made aware of any events may not need to be provided with a message-to-event converter.

In accordance with some aspects and embodiment of the invention, the converters allow more efficient synchronization of events using existing wiring. When a particular event occurs within one of the elements, which other elements in the network need to be made aware of, the local element equipped with a suitable event-to-message converter initiates a message to be communicated using the interconnect to one or more NIUs that need to be aware of the occurrence of the event. This allows signals to be generated and transmitted when events occur, instead of constantly using bandwidth for status updates when no status is changing.

In accordance with some aspects and embodiment of the invention, various agents are allowed to operate in a lower power "wait for event" (WFE) mode, instead of constantly remaining on and monitoring system status. The CPU or other agent can sit in this low power mode until an event targeted for that CPU/agent triggers the CPU to "wake up" and begin consuming power again.

DETAILED DESCRIPTION

Figure 1:
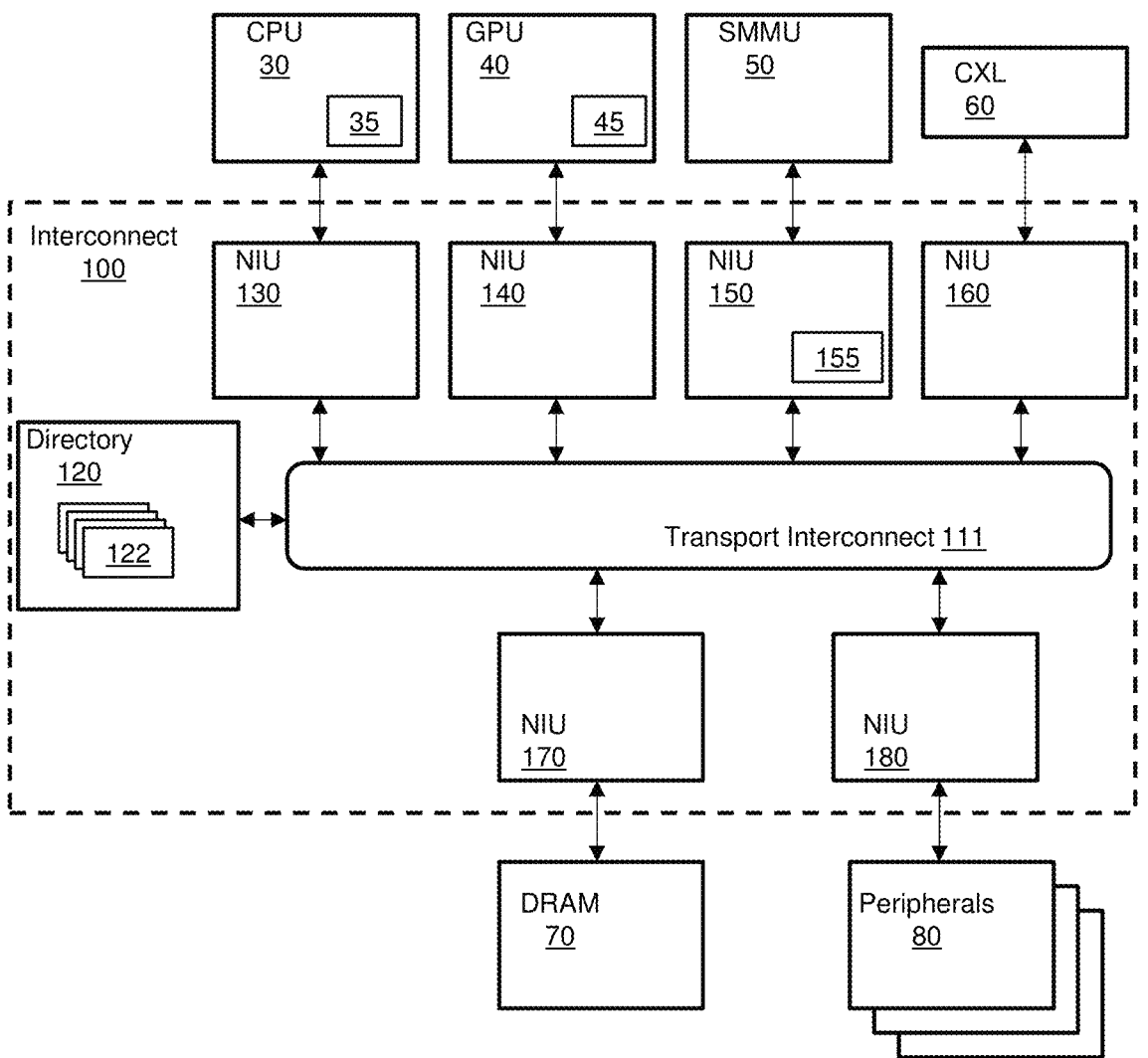
FIG. 1 illustrates a cache coherent interconnect with a distributed implementation in accordance with the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

As used herein, an "initiator" and "sender" refer to intellectual property (IP) modules or units and the terms are used interchangeably within the scope and embodiments of the invention. As used herein, a "receiver" and a "target" refer to similar IP modules or units and the terms are used interchangeably within the scope and embodiments of the invention. As used herein, a transaction may be a request transaction or a response transaction. Examples of request transactions include write request and read request.

The invention applies to cache coherent interconnects that have a distributed implementation. In such a distributed implementation, several elements, or components, connected through a transport, such as for instance, a network-on-chip (NoC), are sending requests, responses, and exchanging messages that signal the various states and state changes of the cache lines that are tracked and maintained by the cache coherent interconnect.

Referring now to FIG. 1, a distributed cache coherent interconnect is shown. In accordance with one example and aspect of the invention, the interconnect 100 provides communication between several agents and elements within a computer system. In accordance with some aspects and embodiment of the invention a transport Interconnect, an interconnect and a network-on-chip (NOC) are the same and the terms are used interchangeably. In accordance with some aspects and embodiments of the invention, a transport interconnect 111 is a lower transport layer whose job is to just move packets of data while the interconnect 100 is referred to as a higher application layer, which understands and handles coherency. The interconnect 100 includes a transport interconnect 111, providing wiring that links all elements of the system. The interconnect 100 controls and manages the state of cache lines so that coherency is maintained. As used herein a cache coherent interconnect allows a set of connected agents, which have internal caches, to be kept coherent with each other.

Agents (or intellectual property (IP) blocks), such as a central processing unit (CPU) 30, a graphical processing unit (GPU) 40, a System Memory Management Module (SMMU) 50, a compute express link (CXL™) interface 60, are connected through protocol converters, also called network interface units (NIUs) 130, 140, 150, and 160 respectively. The illustrated example also provides connections to elements such as DRAM memory 70 and other peripherals 80 through additional NIUs 170 and 180, respectively.

In addition to the external links provided by NIUs, the interconnect 100 may also contain internal modules. Shown in FIG. 1 is the example of an interconnect 100 that includes a directory 120. The directory 120 includes snoop filters 122. The interconnect includes a set of protocol converters in communication with memory and peripherals. The directory 120 is also attached to the transport interconnect 111 for communication with the various NIUs.

In accordance with some aspects and embodiment of the invention, some agents include a cache, such as CPU 30 and GPU 40, illustrated with caches 35 and 45, respectively. In accordance with some aspects and embodiment of the invention, other external agents, such as the SMMU 50, may not be provided with cache and the NIU may be configured to provide a proxy cache 155.

In such a system, it is often needed that the elements exchange information that is not directly related to managing the state of cache lines, but instead, is related to events that are related to the transactions ongoing at the agent interface. For instance, a change of power state of one connected coherent agent, from ON to OFF, or a change of the state of a monitor inside the directory, or the occurrence of an interrupt inside an internal probe.

Figure 2:
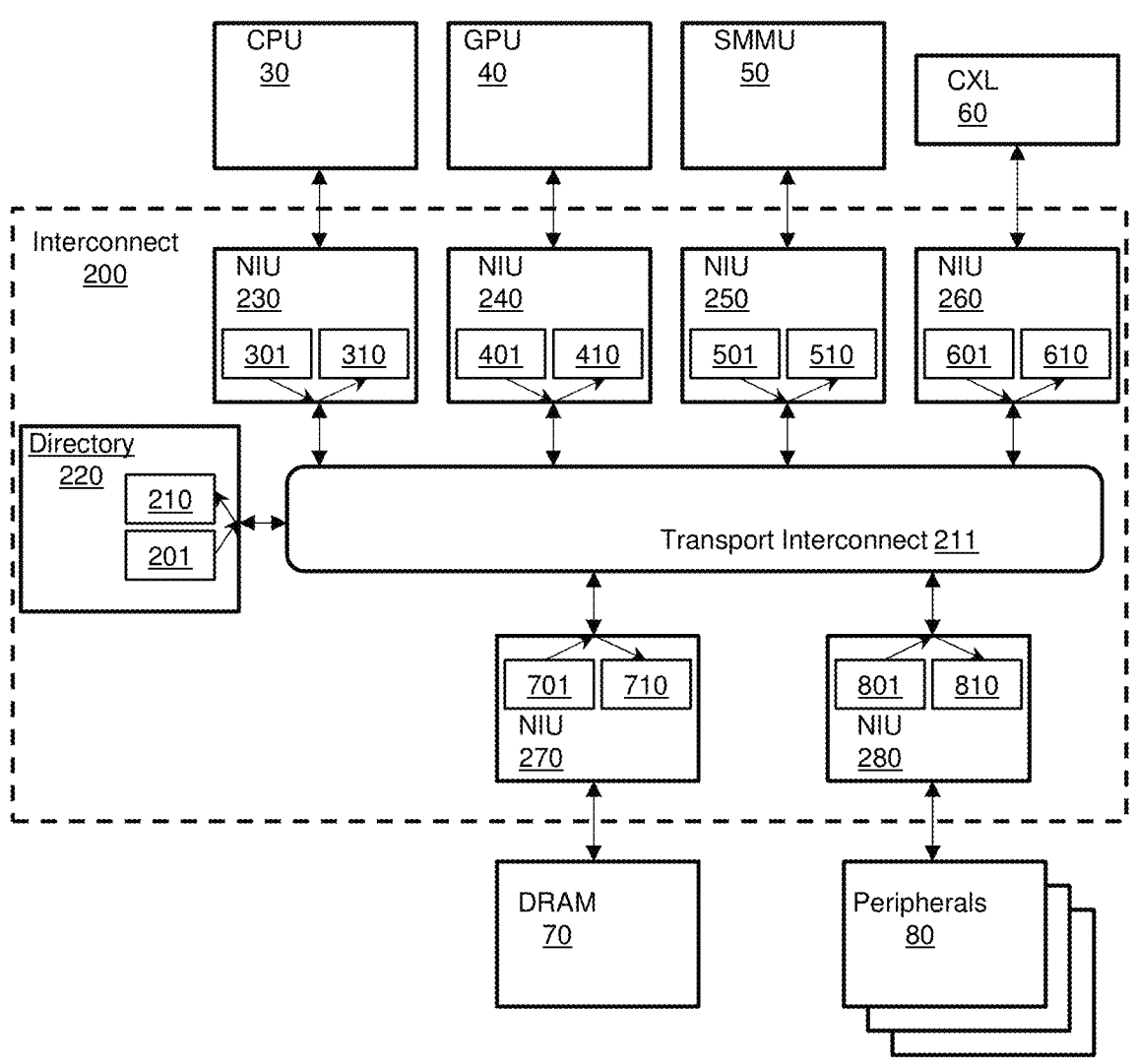
FIG. 2 illustrates a cache coherent interconnect with converters in accordance with the various aspects and embodiments of the invention.

Referring now to FIG. 2, in accordance with various aspects and embodiments of the invention, a cache coherent interconnect 200 is shown. The interconnect 200 includes NIUs 230, 240, 250, 260, 270, and 280, a network-on-chip (NoC) transport interconnect 211. The interconnect 200 also includes various converters, some of which are an event-to-message converters, such as block 201 within the directory 120, and blocks 301, 401, 501, 601, 701, and 801 within the NIUs 130, 140, 150, 160, 170, and 180, respectively. Each of these converters take events as inputs, and generate a corresponding message for the event. The inputted event to a given converter may be received at an incoming port for the converter, and the events that initiate the generation of an event-message (message) may be predetermined set of criteria or conditions, such as the detection of a particular logic level on the port, or the occurrence of a particular transition of certain logic levels from a 0 to a 1 or vice versa. In accordance with some aspects and embodiment of the invention, the message includes information about the one or more destinations (that the event is intended for) of the message, along with an encoding of the semantic of the event.

In accordance with some aspects and embodiment of the invention, although FIG. 2 illustrates an interconnect 200 in which each NIU or module is provided with an event-to-message converter, not every NIU or module may have such a converter. NIUs/modules which do not observe events may not need to be provided with event-to-message converters.

Referring again to FIG. 2, in accordance with various aspects and embodiments of the invention, some of the provided hardware blocks are message-to-event converters, and as illustrated, are provided by block 210 within the directory 120, and blocks 310, 410, 510, 610, 710, and 810 within the NIUs 130, 140, 150, 160, 170, and 180, respectively. Each of these converters take messages as inputs, and interpret the messages that carry event information, such as those produced by converters 201, 301, 401, 501, 601, 701, and 801. Upon receipt, the type (semantic) of the event encoded in the message is decoded, and the corresponding event is generated locally to the receiving (enclosing) agent or component. In accordance with some aspects and embodiment of the invention, local generation of the event can be through changing the state of one or more bits in a register or changing the logic level or levels of one or more ports at the interface of the block, so that the enclosing component can perform the corresponding action.

In accordance with some aspects and embodiment of the invention, although FIG. 2 illustrates an interconnect 200 in which each NIU is provided with a message-to-event converter, not every NIU or module has such a converter. NIUs/modules that do not need to be made aware of any events may not need to be provided with a message-to-event converter.

In accordance with various aspects and embodiments of the invention, upon receiving a message (for an event or event-message), the converter may generate a response message. This response message can encode that the event has been properly received and acted upon, or can encode an error condition has occurred, or provide some other type of status information after the event message has been received. The response message will be transported through the transport interconnect 211 (the NoC). The designated destination for the response message is typically the originator NIU/module that created the initial message (from the event) using an event-to-message converter.

Figure 3:
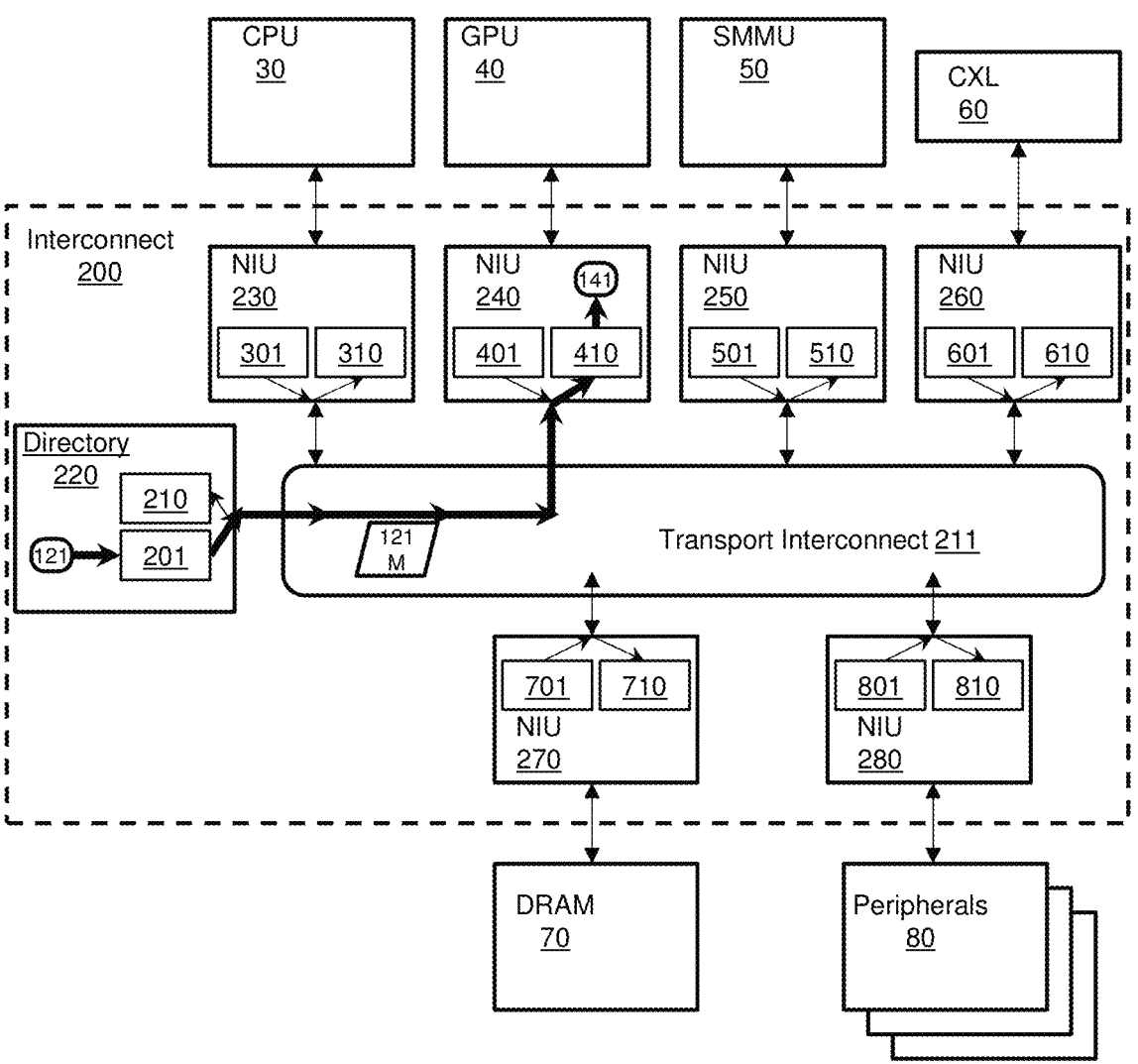
FIG. 3 illustrates an internal event converted, transported, and received using the cache coherent interconnect of FIG. 2 in accordance with the various aspects and embodiments of the invention.

Referring now to FIG. 3, an example of using the event/message/event method within an interconnect 200 is shown in accordance with some aspects and embodiment of the invention. In this particular example, an event 121 occurs within the directory 220, and the GPU 40 should ultimately be informed of this event. The directory 220 is provided with an event-to-message converter 201 that, in response to event 121, generates a message 121M that is transported over the transport interconnect (or NoC) 211. As the GPU 40 is the intended destination, the associated NIU 240 receives the message 121M, and provides it to the message-to-event converter 410. The message-to-event converter 410 reads the message 121M and initiates new event 141 that corresponds to event 121. This achieves the goal of communicating the event 121 without dedicating wires to constantly monitor the status of events in other components.

Figure 4:
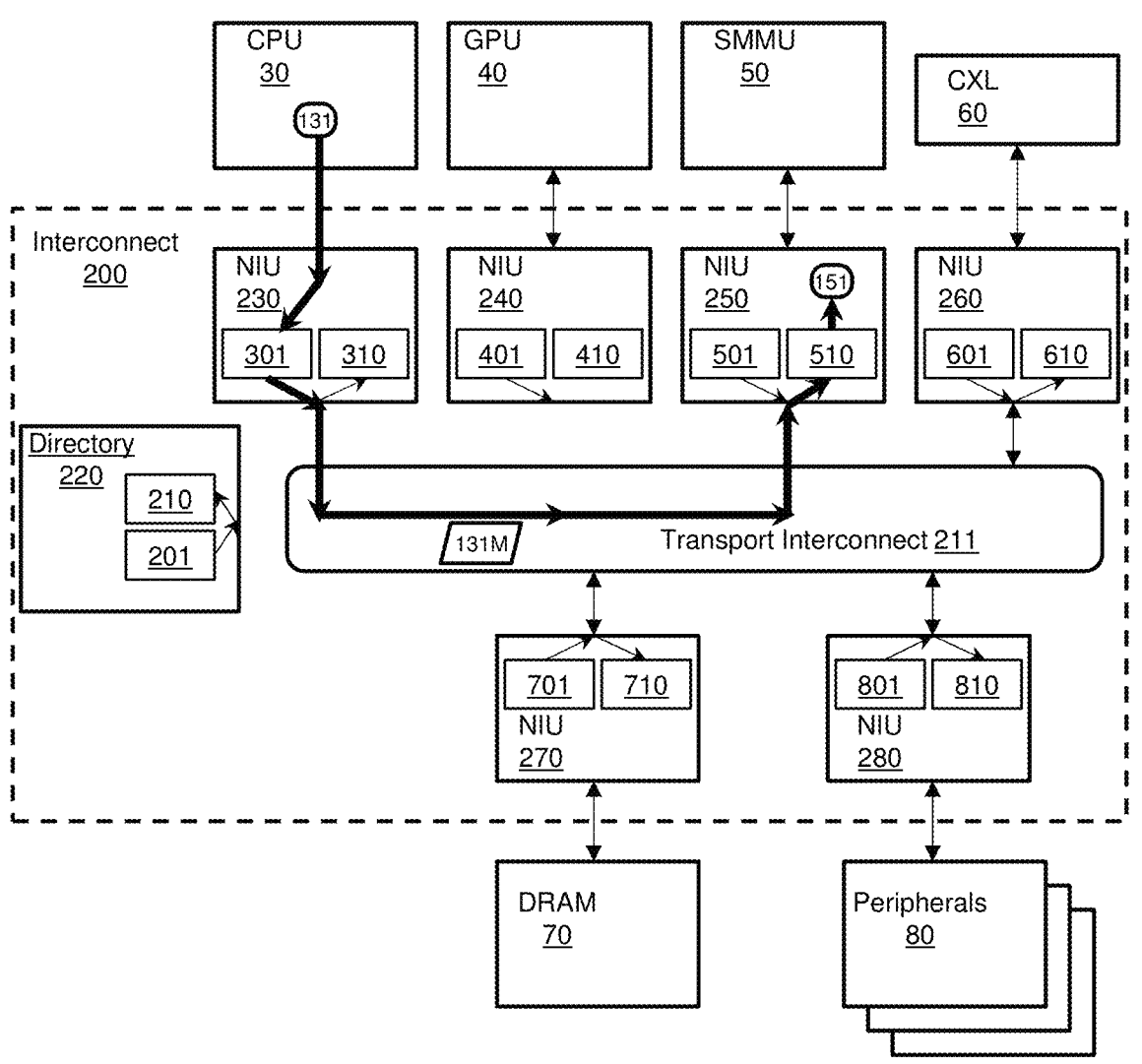
FIG. 4 illustrates an external event converted, transported, and received using the cache coherent interconnect of FIG. 2 in accordance with the various aspects and embodiments of the invention.

Referring now to FIG. 4, an example of using the event/message/event method within an interconnect 200 is shown according to some aspects and embodiments of the invention. In this particular example, an event 131 occurs in external CPU 30 (the originating agent), and the SMMU 50 (destination agent) should ultimately be informed of this event. The CPU 30 transmits the event 131 to its corresponding NIU 230 (the originating NIU). NIU 230 is provided with an event-to-message converter 301 that, in response to event 131, generates a message 131M that is transported over the transport interconnect 211. As the SMMU 50 is the intended destination, the associated NIU 250 (the destination NIU) receives the message 131M, and provides it to the message-to-event converter 510. The message-to-event converter 510 reads the message 131M and initiates new event 151 that corresponds to event 131. This achieves the goal of communicating the event 131 without dedicating wires to constantly monitor the status of events in other components of the system.

Interconnects such as those described here are also typically sending many messages between components that are unrelated to events. Therefore, in accordance with some aspects and embodiment of the invention, in addition to the converter blocks for event/message/events activity, in each component that might send an event related message, a multiplexor may be used to inject event related messages from a converter block into the stream of existing messages normally sent by the component. In accordance with some aspects and embodiment of the invention, in each component that might receive an event related message, a demultiplexer may be used to extract from the stream of existing messages normally received by the component, the event related massages, which will then be directed to the converter.

Figure 5:
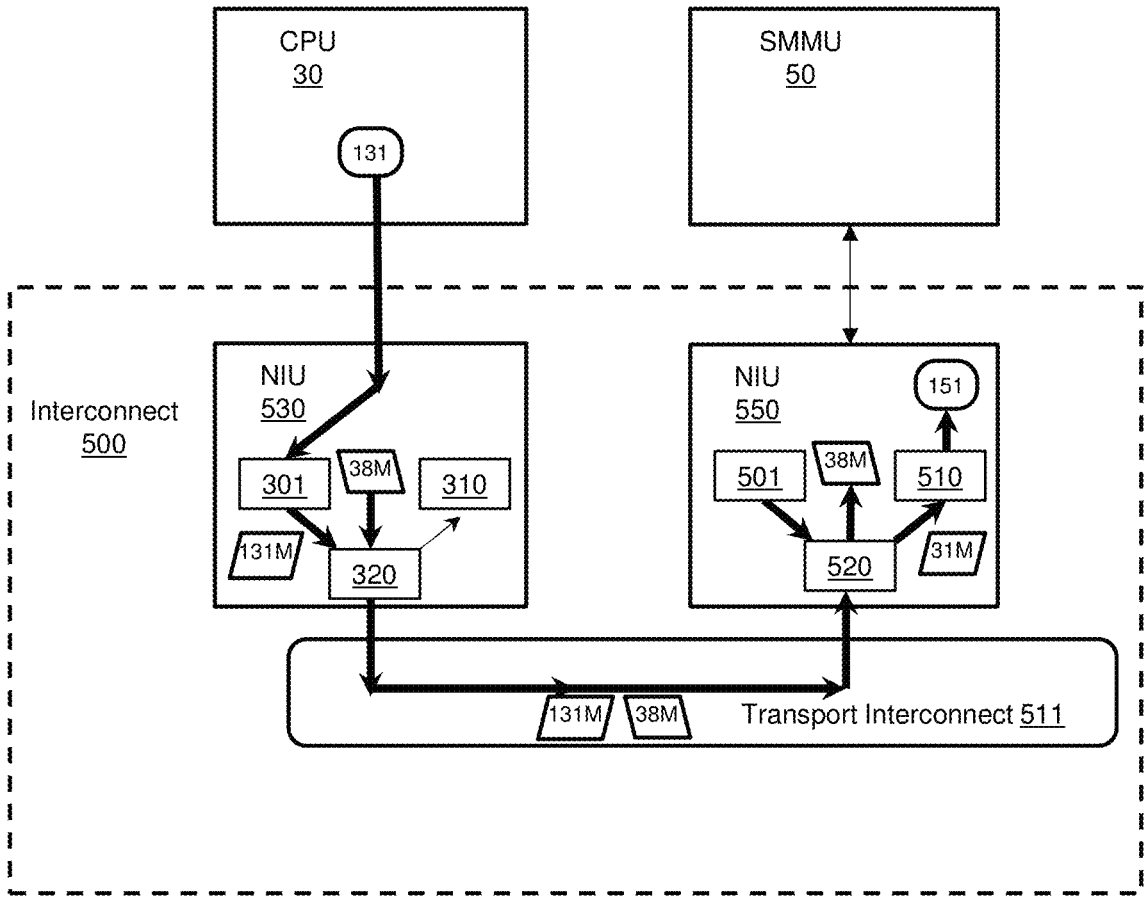
FIG. 5 illustrates a cache coherent interconnect with converters and multiplexors and demultiplexors in accordance with the various aspects and embodiments of the invention.

Referring now to FIG. 5, an example of multiplexors and demultiplexors is provided according to various aspects and embodiments of the invention. As in FIG. 4, an event 131 occurs in CPU 30, and SMMU 50 needs to be informed of the event. NIU 530 is provided with an event-to-message converter 301 that, in response to event 131, generates a message 131M that is transported over the transport interconnect 511. However, NIU 530 additionally creates other messages, shown in this example as message 38M, which may also be communicated to the NoC (interconnect 500 and transport interconnect 511) and, in this example, to SMMU 50. The NIU 530 is therefore also provided with a multiplexor 320 that provides one connection to the transport interconnect 511 for both types of messages (event messages and other messages) from the NIU 530 and from the event-to-message converter 301.

As the SMMU 50 is the intended destination in this example for both messages, the associated NIU 550 is provided with a demultiplexor 520 that receives both messages 131M and 38M. The demultiplexor recognizes that some messages, such as 131M, are destined for the message-to-event converter 510, and provides them to the converter 510, while other messages, such as 38M, are not, and so routes them accordingly within NIU 550. As before, the message-to-event converter 510 reads the message 131M and initiates new event 151 that corresponds to event 131.

In accordance with some aspects and embodiment of the invention, no modification of the transport interconnect will be needed, and the new messages will use or adapt a message format already supported by the interconnect.

However, in some embodiment, the interconnect may be modified to allow transport of these messages as a new class of messages.

Figure 6:
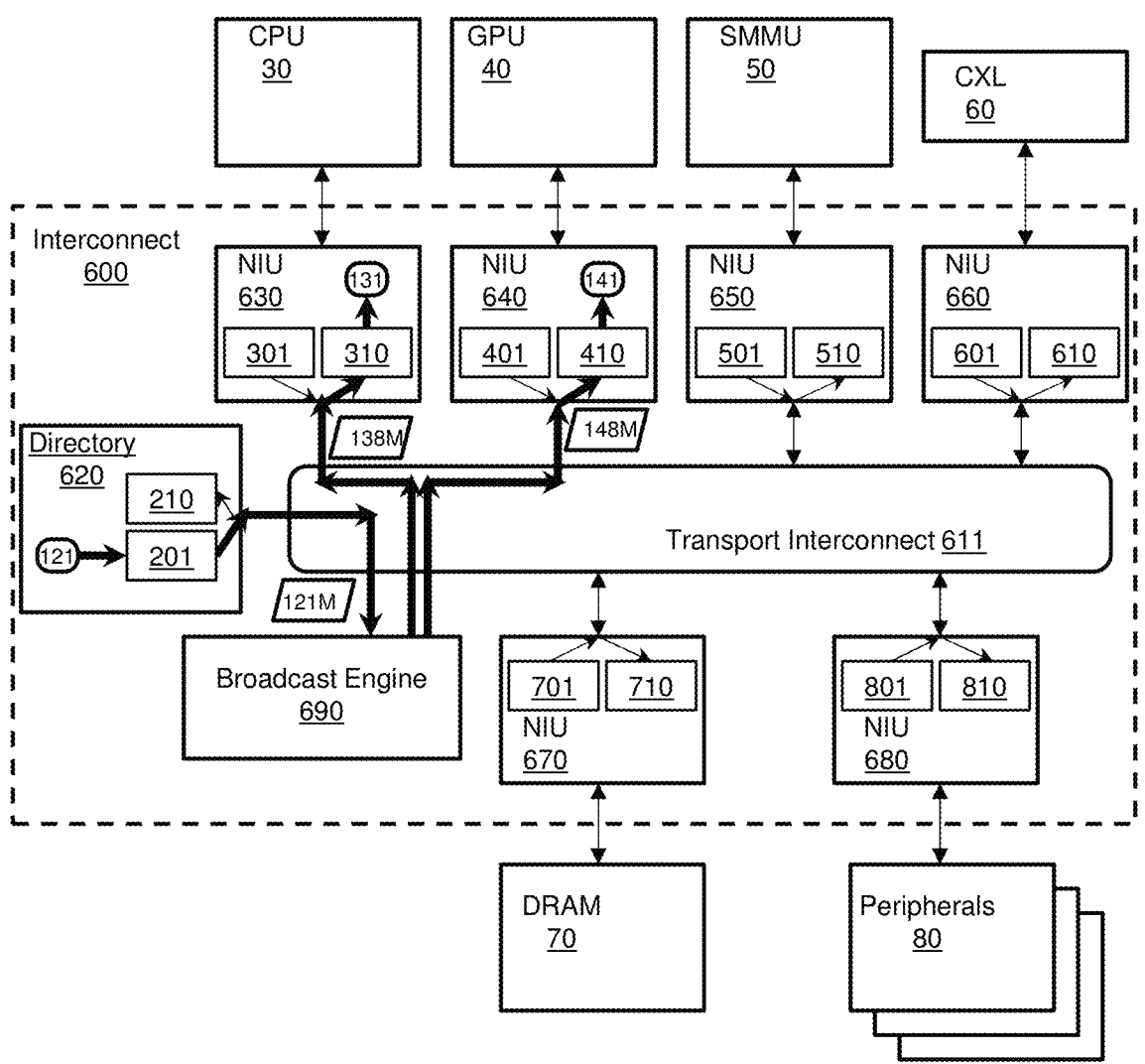
FIG. 6 illustrates a cache coherent interconnect with converters and a broadcast engine in accordance with the various aspects and embodiments of the invention.

Referring now to FIG. 6, in accordance with some aspects and embodiment of the invention, some messages need to be sent to multiple destination. The interconnect 600 includes a broadcast engine 690 because the same message needs to be sent to multiple destinations. The broadcast engine 690 gets a message 121M on its input or ingress port. The broadcast engine 690 duplicates the message and creates as many messages as there are egress ports or destinations. The broadcast engine 690 sends the duplicated messages to each destination, either one after the other (serialized) or simultaneously if the broadcast engine has multiple sending ports connected to the transport interconnect 611.

In this particular example, an event 121 occurs within the internal directory 620, and both the CPU 30 and the GPU 40 should ultimately be informed of this event. The directory 620 is provided with an event-to-message converter 201 that, in response to event 121, generates a message 121M that is transported over the transport interconnect 611. The broadcast engine 690 reads the message 121M and determines it is a message having multiple destinations, and in turn generates two messages 138M, 148M, one destined for NIU 630 associated with the CPU 30, and the other destined for NIU 640 associated with the GPU 40. The respective NIUs 630 and 640 each are provided with message-to-event converters 310 and 410, respectively. The converters 310 and 410 generate events 131 and 141 respectively that correspond to event 121.

In accordance with various aspects and embodiments of the invention, the broadcast engine 690 receives multiple responses from the destinations of a broadcasted message, and performs responses aggregation, before sending a unique response to the sender, in this example the directory 620. During response aggregation, a response combination function (performed by the broadcast engine 690 in accordance with some embodiments of the invention) is used to generate a unique response from possibly different responses. For example and in accordance with one aspect of the invention, if 3 responses are expected back at the broadcast engine 690 and 2 of 3 responses comeback Ok and 1 of 3 responses comes back in error, the response combination function may decide that the resulting aggregated response is in error.

Figure 7:
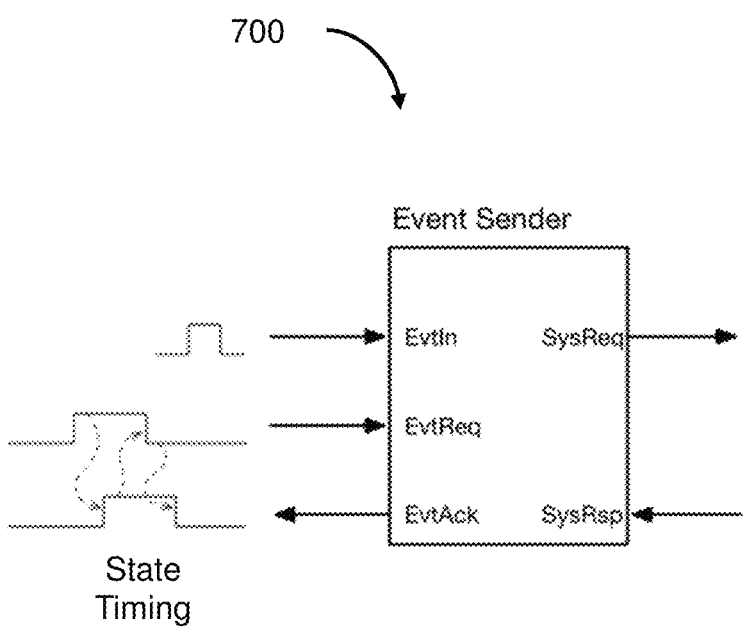
FIG. 7 illustrates an event-to-message converter in accordance with some aspects and embodiments of the invention.

Referring now to FIG. 7, in accordance with various aspects and embodiments of the invention, each interconnect component that signals an event to another interconnect component, either internal or external, is augmented with a hardware block 700, which is similar to blocks 201, 301, 401, 501, 601, 701, and 801. This hardware block 700 takes as input a plurality of events, and create messages corresponding to these events, to be sent to other components that need to be made aware that the event has occurred. A multiplexor is used to combine messages generated by the hardware block 700 with messages generated by the rest of the component.

Figure 8:
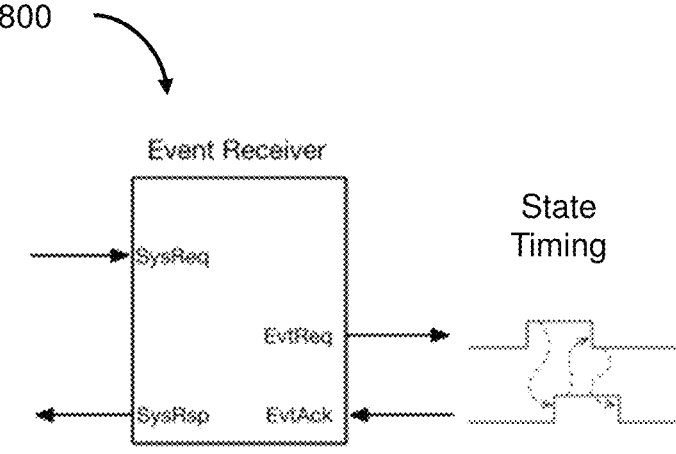
FIG. 8 illustrates a message-to-event converter in accordance with some aspects and embodiments of the invention.

Referring now to FIG. 8, in accordance with various aspects and embodiments of the invention, each interconnect component that is made aware of events occurring on other interconnect component, is augmented with a hardware block 800 which is similar to blocks 210, 310, 410, 510, 610, 710, and 810. This hardware block 800 takes as input messages that carry event occurrence information. The hardware block 800 converts the event occurrence information in the message to an event and drives signals or registers to make the component (receiving the event related information) aware that an event has occurred on or at another component (sending the event related information). A demultiplexer is used to extract from the stream of messages received by the enclosing component, the messages that are related to occurrence of events.

In accordance with some aspects and embodiment of the invention, after sending out all messages, the sender verifies that messages receive responses. The converter or NIU logic tracks events, which will be handled one-at-a-time and no more than one message will be sent to each agent, and counts the number of responses to ensure that each message receives a response.

In accordance with some aspects and embodiment of the invention, an error is considered to have occurred when: a) not all outbound transactions receive a response within the timeout period; or b) one or more SysRsp return an error status, which status reflects accumulated error from all received responses. Whenever a SysReq.Event message arrives, it will be recorded within the input queue o the converter. The queue provides one dedicated storage location for each source of events. Possible sources of events are: CAIU, NCAIU, DCE, DMI, DII etc.

In accordance with various aspects and embodiments of the invention, a broadcast engine is in communication with some components, connected to the transport interconnect, whose role is to duplicate incoming messages that have multiple destinations, into as many messages as there are destinations (based on egress port of the broadcast engine), and sending the duplicates through the transport interconnect towards their multiple destinations. The number of broadcast engines within an interconnect is not limited; many may be used. In addition, the broadcast engine performing response aggregation when a message has been duplicated and sent to multiple destinations, so that all responses from these destinations are combined into one response, which is then sent the original sender.

In accordance with various aspects and embodiments of the invention, in some embodiments, the event-to-message converter is implemented as a finite state machine (FSM). The sender state-machine will be idle after reset. When the EventInReq is asserted by the source, the state machine will enter the Send state and start sending SysReq.Event messages to all receivers in the system. Maestro shall provide a vector, listing all receivers.

Events are indistinguishable from each other and may be aggregated—all arriving messages within a certain time period, for example while the interface is occupied with a previous event, may be combined into a single event. The output of the queue feeds into the event generator and the response generator; thus, every arriving event is be responded to with a response message. If the arriving message does not indicate an error status, the response (order of severity) shall be:

OK—if the agent is enabled to receive events (least severe error);

BUSY—if the agent is disabled

ERROR—event generator did not receive EventAck in the timeout period

ERROR—received command message indicates error (most severe error)

In accordance with some aspects and embodiment of the invention, the timeout period for the event handshake may be hard-coded to a significantly smaller value than the protocol timeout. The Event Receiver State Machine, illustrated in FIG. 10, receives arriving event messages and converts them into the 4-phase handshake protocol. Even though the messaging protocol allows fast bursts of event messages to arrive—multiple event messages may trigger only a single event sequence through the state machine.

Several embodiments of the invention, including the best mode contemplated by the inventors, have been disclosed. It will be recognized that, while specific embodiments may be presented, elements discussed in detail only for some embodiments may also be applied to others.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

While specific materials, designs, configurations and fabrication steps have been set forth to describe this invention and the preferred embodiments, such descriptions are not intended to be limiting. Modifications and changes may be apparent to those skilled in the art, and it is intended that this invention be limited only by the scope of the appended claims.

The scope of the invention, therefore, is not intended to be limited to the exemplary embodiments shown and described herein. Rather, the scope and spirit of present invention is embodied by the appended claims.

What is claimed is:

1. A network-on-chip (NoC) including cache coherency, the NoC comprising:

a transport interconnect; and a plurality of network interface units (NIUs) in communication with the transport interconnect, wherein each NIU is in communication with an agent and each NIU includes an event-to-message converter for converting events into messages by detection of a transition of a logic level on an input port of the event-to-message converter to generate a message that includes information about one or more destinations for the event to be delivered along with an encoding of the event and sending the messages through the NoC to a message-to-event converter for receiving messages from the NoC and converting the messages into events at the destinations, wherein an originating NIU uses the transport interconnect to send the message to at least one destination target, which is in communication with a destination NIU that is selected from the plurality of NIUs, and wherein a message-to-event converter at the destination NIU converts the message to a destination event that is passed on to the destination agent from the destination NIU.

2. The NoC of claim 1, wherein the message-to-event converter receives messages that are converted into events.

3. The NoC of claim 1, wherein the destination NIU, in response to receiving the message, generates a response message for transmission over the transport interconnect back to the originating NIU to acknowledging receipt of the event at the destination agent.

4. The NoC of claim 2, wherein at least one NIU includes at least one multiplexor to combine messages initiated by the event-to-message converter with other messages generated by the at least one NIU.

5. The NoC of claim 1, wherein the at least one NIU includes at least one demultiplexor that extracts messages received from the NoC, and directs extracted messages related to events from any event-to-message converter to the message-to-event converter of the at least one NIU.

6. A method of communication of events using network-on-chip (NoC), the method comprising:

generating an event signal for an agent, wherein the event signal is an indication of a state change in the agent;

generating an event message that encodes information about the event signal by receiving an input at an incoming port of an event-to-message converter, wherein the event signal represent a change condition of the agent, transmitting the event message using the NoC to a destination network interface unit (NIU);

receiving the event message at the destination NIU; and converting, using a message-to-event converter at the destination NIU, the event message to a destination event.

7. The NoC of claim 6, wherein the destination NIU, in response to receiving the message, generates a response message for transmission over the NoC back to an originating NIU to acknowledging receipt of the event at the destination agent.

8. The NoC of claim 6, wherein at least one NIU includes at least one multiplexor to combine messages initiated by the event-to-message converter with other messages generated by the at least one NIU.

9. The NoC of claim 8, wherein the at least one NIU includes at least one demultiplexor that extracts messages, which are related to events sent from any event-to-message converter, and directs the extracted messages to the message-to-event converter of the at least one NIU.

* * * * *